(12) United States Patent
Kimura et al.

(10) Patent No.: US 7,552,455 B2
(45) Date of Patent: Jun. 23, 2009

(54) OBJECTIVE LENS WITH ELASTIC SUPPORT STRUCTURE

(75) Inventors: Katsuhiko Kimura, Kasumigaura (JP);
Seiichi Katou, Tsuchiura (JP);
Kazuyuki Fukuda, Kasumigaura (JP);
Hidenao Saito, Yokohama (JP)

(73) Assignee: Hitachi Media Electronics Co., Ltd., Mizusawa-Shi (JP)

( * ) Notice: Subject to any disclaimer, the term of this patent is extended or adjusted under 35 U.S.C. 154(b) by 619 days.

(21) Appl. No.: 11/229,559

(22) Filed: Sep. 20, 2005

(65) Prior Publication Data
US 2006/0242660 A1 Oct. 26, 2006

(30) Foreign Application Priority Data
Apr. 22, 2005 (JP) ............................. 2005-124407

(51) Int. Cl.
*G11B 7/00* (2006.01)
(52) U.S. Cl. .................... 720/681; 720/682; 720/684
(58) Field of Classification Search ................. None
See application file for complete search history.

(56) References Cited

FOREIGN PATENT DOCUMENTS

| JP | 07-226056 | | 8/1995 |
|----|-----------|---|--------|
| JP | 07226056 A | * | 8/1995 |
| JP | 09-198683 | | 7/1997 |
| JP | 09198683 A | * | 7/1997 |
| JP | 09198708 A | * | 7/1997 |

OTHER PUBLICATIONS

English translation of JP 07-226056.*

* cited by examiner

Primary Examiner—Wayne R Young
Assistant Examiner—Adam R Giesy
(74) Attorney, Agent, or Firm—Antonelli, Terry, Stout & Kraus, LLP.

(57) ABSTRACT

The invention can obtain an excellent linear property in a focusing direction and a tracking direction and can obtain a stable operation, in an objective lens driving means of an optical pickup. In an optical pickup reading and writing an information with respect to an optical disc by using an objective lens, a movable portion mounting the objective lens thereon is supported by a support member constituted by a pair of flexible printed circuit boards respectively curved in opposite directions in a parallel direction to an optical axis of the objective lens so as to be movable with respect to a fixed portion, in both side surfaces of the movable portion facing with holding the objective lens therebetween.

6 Claims, 6 Drawing Sheets

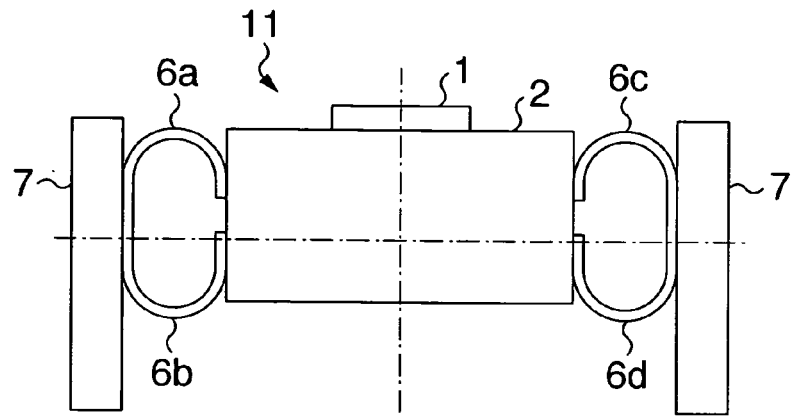
FIG. 2A
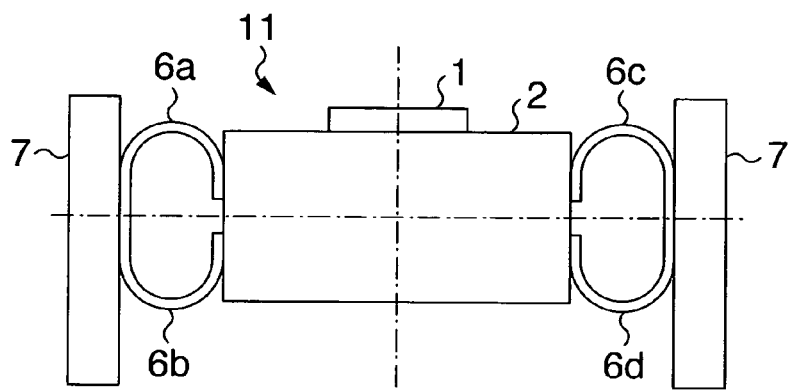
FIG. 2B
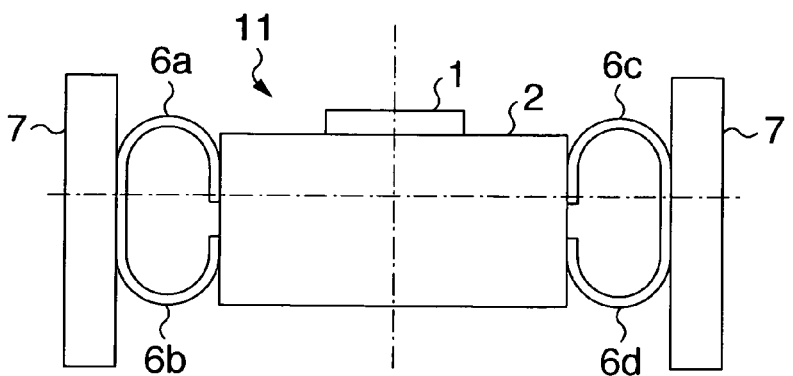
FIG. 2C
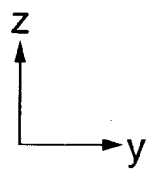

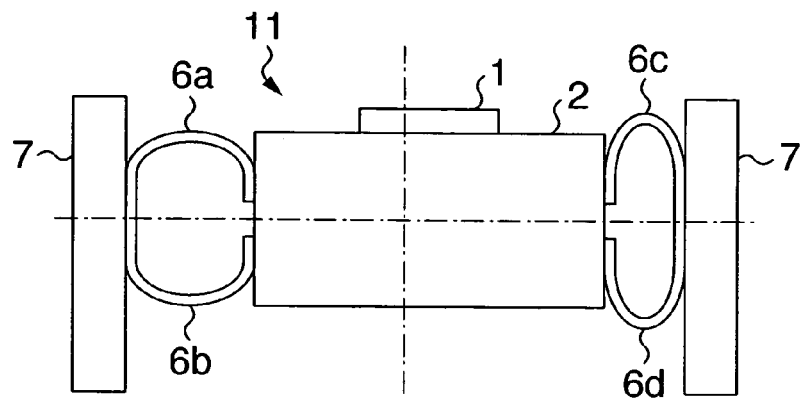
FIG. 3A
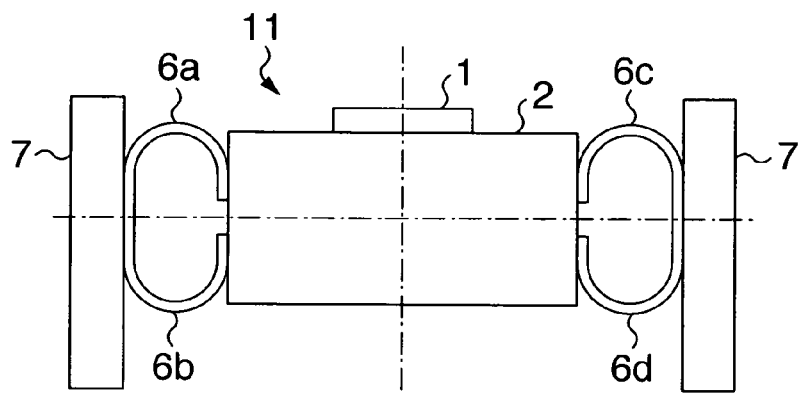
FIG. 3B
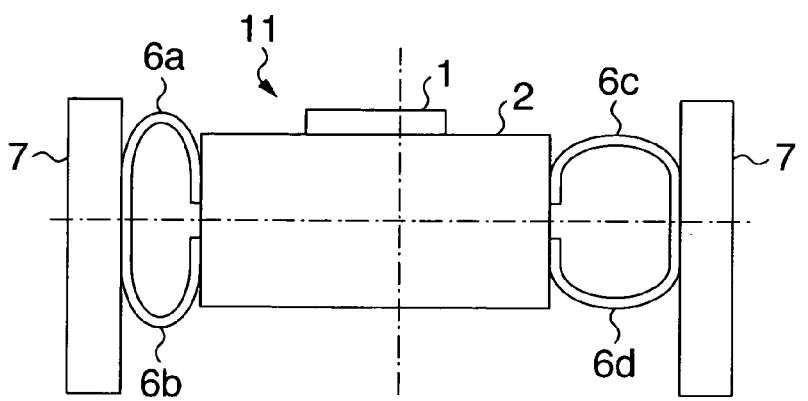
FIG. 3C
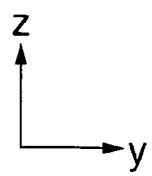

OBJECTIVE LENS WITH ELASTIC SUPPORT STRUCTURE

TECHNICAL FIELD

The present invention relates to an optical pickup provided in an optical disc apparatus reading an information recorded on a recording surface of an optical disc or recording an information on the optical disc.

BACKGROUND ART

A general objective lens driving means of the optical pickup of the optical disc apparatus is constituted by a movable portion mounting an objective lens thereon, a support member supporting the movable portion, a focusing coil and a tracking coil generating driving forces in a focusing direction and a tracking direction, and a magnetic circuit comprising a yoke and a permanent magnet. The movable portion is driven in the focusing direction by an electromagnetic force generated on the basis of an operation of a magnetic field from the permanent magnet by applying a driving current to the focusing coil, and the movable portion is driven in the tracking direction by an electromagnetic force generated on the basis of an operation of the magnetic field from the permanent magnet by applying the driving current to the tracking coil in the same manner.

An example of a conventional structure of the objective lens driving means mentioned above is described in JP-A-7-226056 (patent document 1 (refer to FIG. 1)). In this publication, a C-shaped flexible printed circuit board is fixedly connected to a head portion corresponding to the movable portion and an electromagnetic yoke corresponding to a fixed portion below the head portion.

Further, in JP-A-9-198683 (patent document 2 (refer to FIG. 1)), a C-shaped rubber damper is fixedly connected to an actuator main body corresponding to the movable portion and a yoke main body corresponding to the fixed portion in a horizontal direction of the actuator main body.

DISCLOSURE OF THE INVENTION

Problem to be Solved by the Invention

The head apparatus described in the patent document 1 mentioned above is supported in such a manner as to be floated from the magnetic yoke by each one curved flexible printed circuit board in an end portion in the tracking direction of the optical head portion. However, in the case of being actuated in the focusing direction in this structure, a curvature of the curve of the flexible printed circuit board becomes small in the case that the optical head portion comes close to the magnetic yoke, and on the contrary, the curvature of the curve of the flexible printed circuit board becomes large in the case that the optical head portion comes away from the magnetic yoke. If the curvature of the curve of the flexible printed circuit board is different at a time of operating in the focusing direction, a spring constant is changed in accordance with a position in the focusing direction. Accordingly, there is a risk that a linear property of the operation in the focusing direction is lowered, and a stable operation can not be obtained.

In the patent document 2, since the rubber damper is arranged in such a manner as to be formed in the C shape as seen from a direction of an optical axis of the objective lens, the spring constant with respect to the operation in the focusing direction becomes extremely large, and there is a problem that the operation in the focusing direction is hard to be executed. Further, the objective lens can be freely actuated within a surface perpendicular to the optical axis of the objective lens if only the rubber damper formed in the C shape as seen from the direction of the optical axis of the objective lens is provided, so that the operation is generated in the directions perpendicular to both of the focusing direction and the tracking direction. Therefore, a shaft limiting the operation of the actuator is required, and a number of the parts is increased.

SUMMARY OF THE INVENTION

An object of the present invention is to provide an optical pickup which equalizes spring constants with respect to operations in both directions of a focusing direction in a movable portion mounting an objective lens thereon, improves a stability of the operation, and can stably move in a tracking direction.

In order to achieve the object mentioned above, the present invention is structured as follows.

An optical pickup reading and writing an information with respect to an optical disc by using an objective lens, comprising:

an objective lens;

a movable portion mounting the objective lens thereon;

a pair of elastic plates curved in a C shape or an O shape; and a fixed portion connected to the movable portion via a pair of elastic plates, wherein the fixed portion has a surface facing to both side surfaces facing to each other with holding the objective lens of the movable portion therebetween, and each of a pair of elastic plates has a layout giving the appearance of the C shape or the O shape as seen from a direction perpendicular to an optical axis of the objective lens in each of the both side surfaces of the movable portion, and is fixedly connected to the side surface of the movable portion and a surface of the fixed portion facing to the side surface.

In accordance with the present invention, since it is possible to equalize the spring constant of the support member without reference to the operating position in the focusing direction by fixedly connecting the side surface of the movable portion to the fixed portion facing to the side surface by means of a pair of elastic plates curved in the C shape or the O shape as seen from the direction perpendicular to the optical axis of the objective lens, in both the side surfaces of the movable portion, it is possible to obtain a stable operation excellent in a linear property as the operations in the focusing direction and the tracking direction. As a result, it is possible to improve a position controllability of the objective lens, and it is possible to accurately record and reproduce the information on the optical disc.

Other objects, features and advantages of the invention will become apparent from the following description of the embodiments of the invention taken in conjunction with the accompanying drawings.

BRIEF DESCRIPTION OF THE DRAWINGS

FIGS. 2A-2C are is an explanatory views of an operation of the objective lens driving means shown in FIG. 1;

FIGS. 3A-3C are an explanatory views of the operation of the objective lens driving means shown in FIG. 1;

DESCRIPTION OF THE PREFERRED EMBODIMENTS

A description will be given of embodiments of an optical pickup in accordance with the present invention with reference to the accompanying drawings.

Embodiment 1

Figure 6:
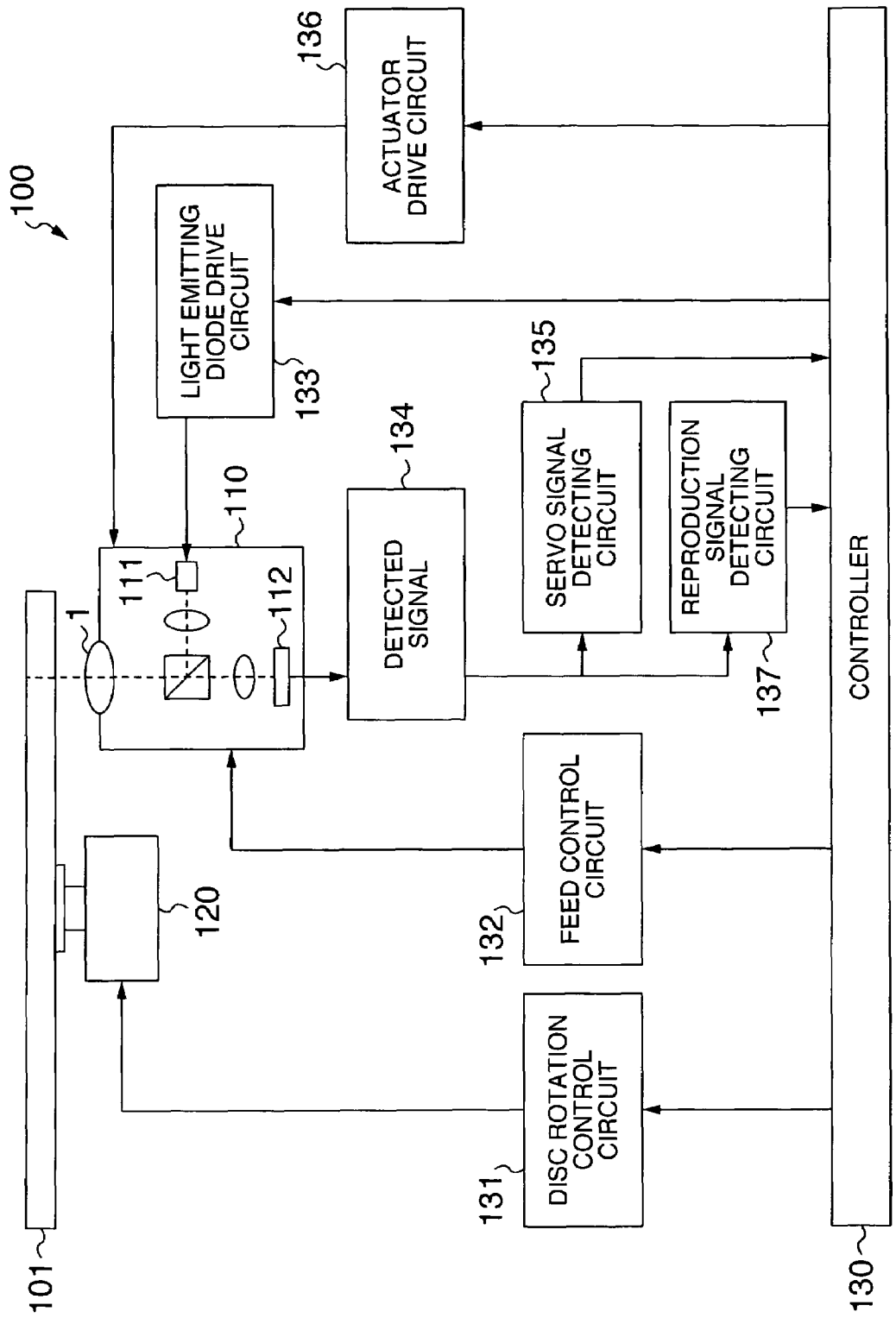
FIG. 6 is a block diagram of an embodiment of an optical disc apparatus in accordance with the present invention.

First, a description will be given of an optical disc apparatus 100 mounting an optical pickup 110 thereon by using a block diagram in FIG. 6. The optical disc apparatus 100 is provided with a spindle motor 120 rotating the optical disc 101, the optical pickup 110 reading an information from the optical disc 101 or writing the information on the optical disc 101, and a controller 130 controlling them. The optical pickup 110 has a laser light emitting diode 111, an optical part such as an objective lens 1 or the like and an objective lens driving means.

A disc rotation control circuit 131 connected to the controller 130 rotationally drives the spindle motor 120 mounting the optical disc 101 thereon on the basis of a command from the controller 130. Further, a feed control circuit 132 connected to the controller 130 moves the optical pickup 110 in a radial direction of the optical disc 101 on the basis of a command from the controller 130.

A light emitting diode drive circuit 133 is connected to the laser light emitting diode 111 mounted on the optical pickup 110. If a drive signal is given to the laser light emitting diode 111 from the light emitting diode drive circuit 133 on the basis of the command from the controller 130, the laser light emitting diode 111 emits a laser light. The laser light is focused on the optical disc 101 by the objective lens 1. The focused laser light is reflected by the optical disc 101, passes through the objective lens 1, and enters into a light detector 112. A detection signal 134 obtained by the light detector 112 is sent to a servo signal detecting circuit 135 and a reproduction signal detecting circuit 137. A servo signal is generated on the basis of the detection signal 134 sent to the servo signal detecting circuit 135, and is input to an actuator drive circuit 136.

The actuator drive circuit 136 inputs a drive signal to a first electromagnetic coil or a second electromagnetic coil which are not illustrated here of the optical pickup, and controls so as to position the objective lens 1. On the other hand, a reproduction signal is generated from the detection signal 134 input to the reproduction signal detecting circuit 137, and the information of the optical disc 101 is reproduced.

A description will be given below of details of an objective lend driving means 50 provided in the optical pickup 110 shown in FIG. 6.

Figure 1:
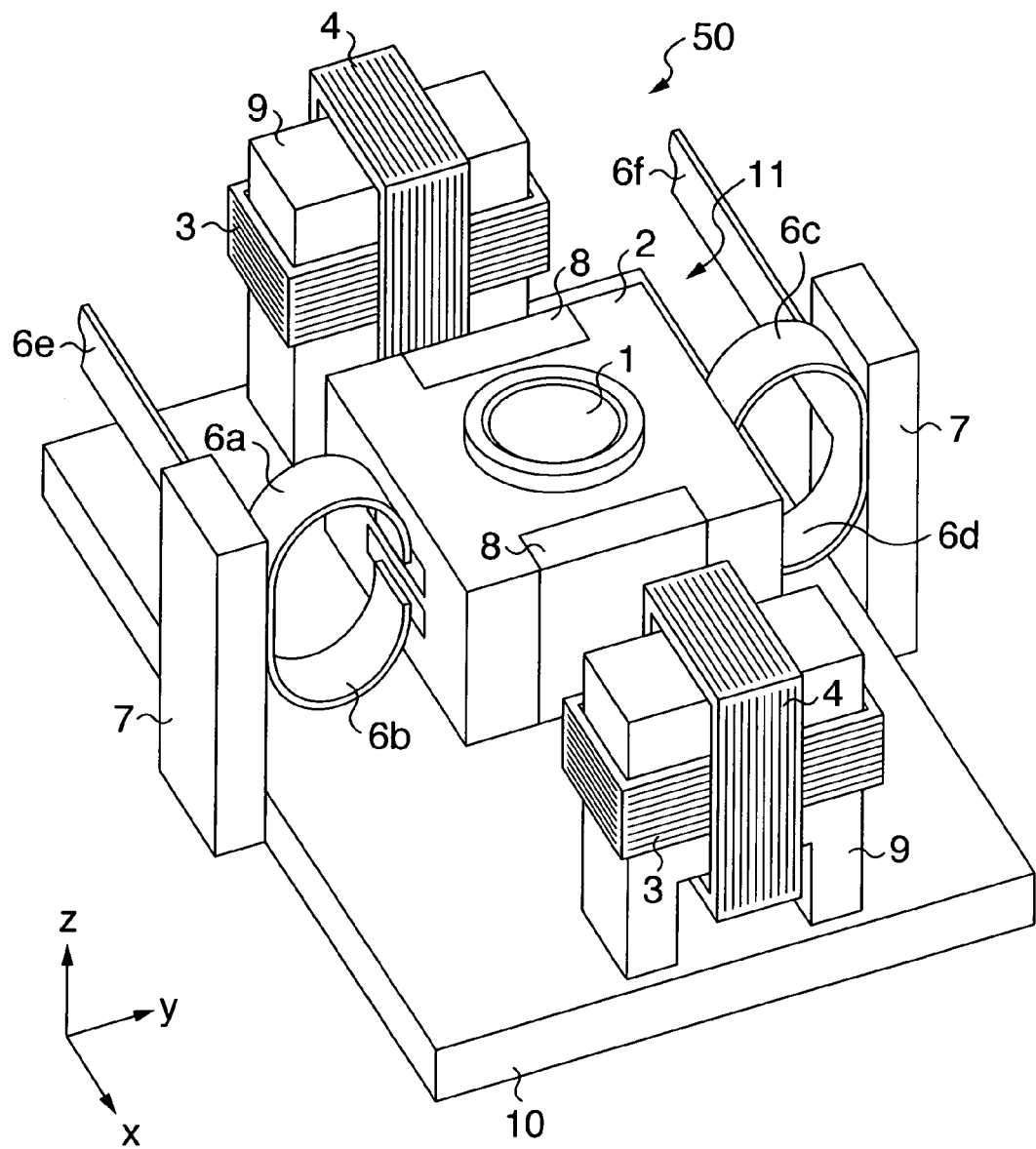
FIG. 1 is a top elevational view of an embodiment of an objective lens driving means of an optical pickup in accordance with the present invention.

FIG. 1 is a perspective view of the objective lens driving means 50 of the optical pickup 110 in accordance with the present invention. In the drawing, a direction z corresponds to a focusing direction moving the objective lens 1 close to or apart from the optical disc surface along the optical axis of the objective lens 1, and a direction y corresponds to a tracking direction actuating the objective lens 1 in a radial direction of the optical disc. A direction orthogonal to both the direction y and the direction z is set to a direction x. The objective lens 1 is mounted on an upper surface of a holder 2, and a permanent magnet 8 is attached to a side surface facing to the direction x of the holder 2. An optical part such as a laser light emitting diode, a light detector or the like which are not illustrated is mounted in an inner portion of the holder 2. A movable portion 11 including the objective lens 1 and the holder 2 is fixedly connected to a fixed portion 7 having a surface facing to both side surfaces facing to the tracking direction of the holder 2 by a pair of elastic plates 6a, 6b, 6c and 6d arranged in both the side surface.

The elastic plates 6a, 6b, 6c and 6d are arranged in such a manner as to be respectively curved in the C shape as seen from the direction perpendicular to the optical axis of the objective lens 1 in both the side surfaces facing in the tracking direction of the holder 2. Further, a pair of elastic plates 6a and 6b or 6c and 6d have a layout giving the appearance of O shape. In other words, the elastic plates 6a and 6c are formed in such a manner as to be curved convex in a direction close to the optical disc (not shown), and the elastic plates 6b and 6d are formed in such a manner as to be curved convex in a direction apart from the optical disc (not shown).

One end of each of the elastic plates 6a, 6b, 6c and 6d is fixed to a side surface perpendicular to the tracking direction of the holder 2 by a solder or the like, and the other end thereof is attached to the surface perpendicular to the tracking direction of the fixed portion 7. At this time, each of the elastic plates 6a, 6b, 6c and 6d is fixedly connected to the side surface of the movable portion and the surface of the fixed portion 7 by the same plate surface. A pair of elastic plates 6a and 6b, and 6c and 6d are respectively arranged in one elastic plates 6e and 6f. In this case, the elastic plates 6a to 6f are structured, for example, by a flexible printed circuit board. In this case, the laser light emitting diode 111, the light detector 112 and the like mounted on the holder 2 are electrically connected to an external portion through the elastic plates 6a to 6f.

The first electromagnetic coil 3 and the second electromagnetic coil 4 are attached to a yoke 9, and are arranged apart from the permanent magnet 8 of a movable portion 11. The fixed portion 7 and the yoke 9 are fixed to a base 10. A description will be given of an operation of the objective lens driving means 50. If a drive current corresponding to a drive signal is applied to the first electromagnetic coil or the second electromagnetic coil from the actuator drive circuit shown in FIG. 6, an electromagnetic force is generated on the basis of an interaction with respect to the permanent magnet 8, and the movable portion 11 is driven in the focusing direction or the tracking direction.

FIGS. 2A-2C and 3A-3C show states of the elastic plates 6a, 6b, 6c and 6d at a time when the movable portion 11 is operated. FIGS. 2A-2C show a case that the movable portion 11 is operated in the focusing direction (the direction z), and FIGS. 3A-3C show a case that the movable portion 11 is operated in the tracking direction (the direction y). In this case, in order to make a description easy, only the movable portion 11, the elastic plates 6a, 6b, 6c and 6d and the fixed portion 7 are illustrated.

In FIGS. 2A-2C, FIG. 2B shows a case that the movable portion 11 exists at a neutral position, FIG. 2A shows a case that the movable portion 11 is operated in a direction coming close to the optical disc (not shown) (toward an upper side in the drawing) from the neutral position, and FIG. 2C shows a case that the movable portion 11 is operated in a direction coming away from the optical disc (not shown) (toward a lower side in the drawing) from the neutral position. In this case, a deformed state of the elastic plates 6a and 6c in FIG. 2A is equal to a deformed state of the elastic plates 6b and 6d in FIG. 2C, and a deformed state of the elastic plates 6b and 6d in FIG. 2A is equal to a deformed state of the elastic plates 6a and 6c in FIG. 2C. Accordingly, spring constants of the elastic plates 6a, 6b, 6c and 6d with respect to the operation in both plus and minus directions in the focusing direction are equal to each other, and it is possible to obtain a stable operation having an excellent linear property in the focusing direction.

Further, in FIGS. 3A-3C, FIG. 3B shows a case that the movable portion 11 exists at a neutral position, FIG. 3A shows a case that the movable portion 11 is operated in a right tracking direction in the drawing from the neutral position, and FIG. 3C shows a case that the movable portion 11 is operated in a left tracking direction in the drawing from the neutral position. In FIG. 3A, the left elastic plates 6a and 6b of the movable portion 11 are drawn out in the drawing, and the right elastic plates 6c and 6d of the movable portion 11 are formed in a crushed shape. In FIG. 3C, the left elastic plates 6a and 6b of the movable portion 11 are crushed in the drawing, and the right elastic plates 6c and 6d of the movable portion 11 are formed in a drawn-out shape. In this case, a deformed state of the elastic plates 6a and 6b in FIG. 3A is equal to a deformed state of the elastic plates 6c and 6d in FIG. 3C, and a deformed state of the elastic plates 6c and 6d in FIG. 3A is equal to a deformed state of the elastic plates 6a and 6b in FIG. 3C. Accordingly, spring constants of the elastic plates 6a, 6b, 6c and 6d with respect to the operation in both plus and minus directions in the tracking direction are equal to each other, and it is possible to obtain a stable operation having an excellent linear property in the tracking direction.

Figure 4A:
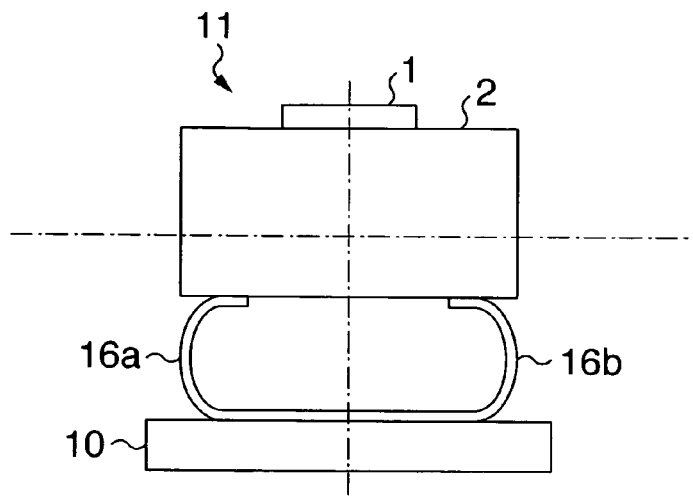
FIGS. 4A-4C are explanatory views of an operation of an objective lens driving means which is different from the present invention.
Figure 4B:
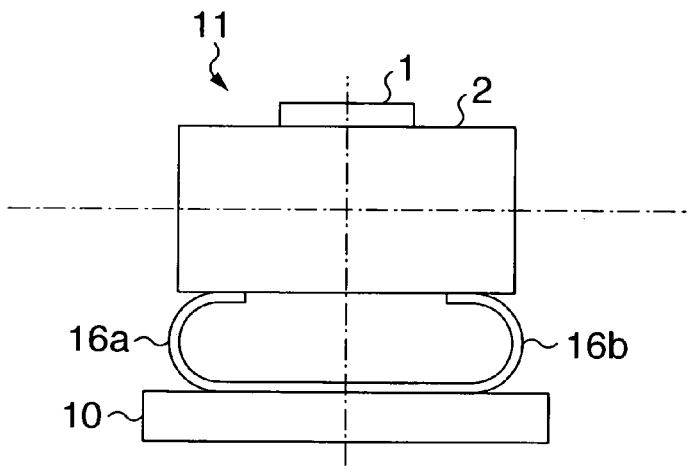
Figure 4C:
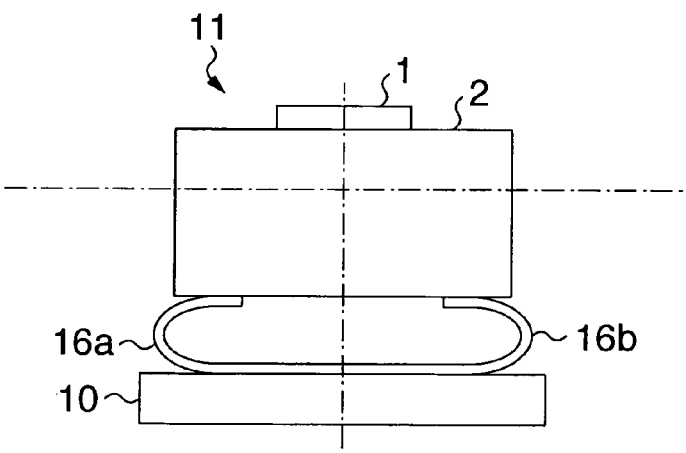

On the other hand, FIGS. 4A-4C show a state in which the movable portion 11 is operated in the focusing direction in the case of supporting the movable portion 11 by respective one curved elastic plates 16a and 16b in end portions in the tracking direction in such a manner as to float by setting the base 10 as the fixed portion.

FIG. 4B shows a case that the movable portion 11 exists at a neutral position, FIG. 4A shows a case that the movable portion 11 is operated in a direction moving close to the optical disc (not shown) (toward an upper side in the drawing) from the neutral position, and FIG. 4C shows a case that the movable portion 11 is operated in a direction moving apart from the optical disc (not shown) (toward a lower side in the drawing) from the neutral position. In FIG. 4A, the elastic plates 16a and 16b are drawn out, and in FIG. 4C, the elastic plates 16a and 16b are formed in a crushed shape. Accordingly, deformed shapes of the elastic plates 16a and 16b are differentiated in accordance with the operated positions in the focusing direction. This means that spring resistances of the elastic plates 16a and 16b are changed in correspondence to the position in the focusing direction, and a linear property of the operation in the focusing direction is lowered.

Figure 5:
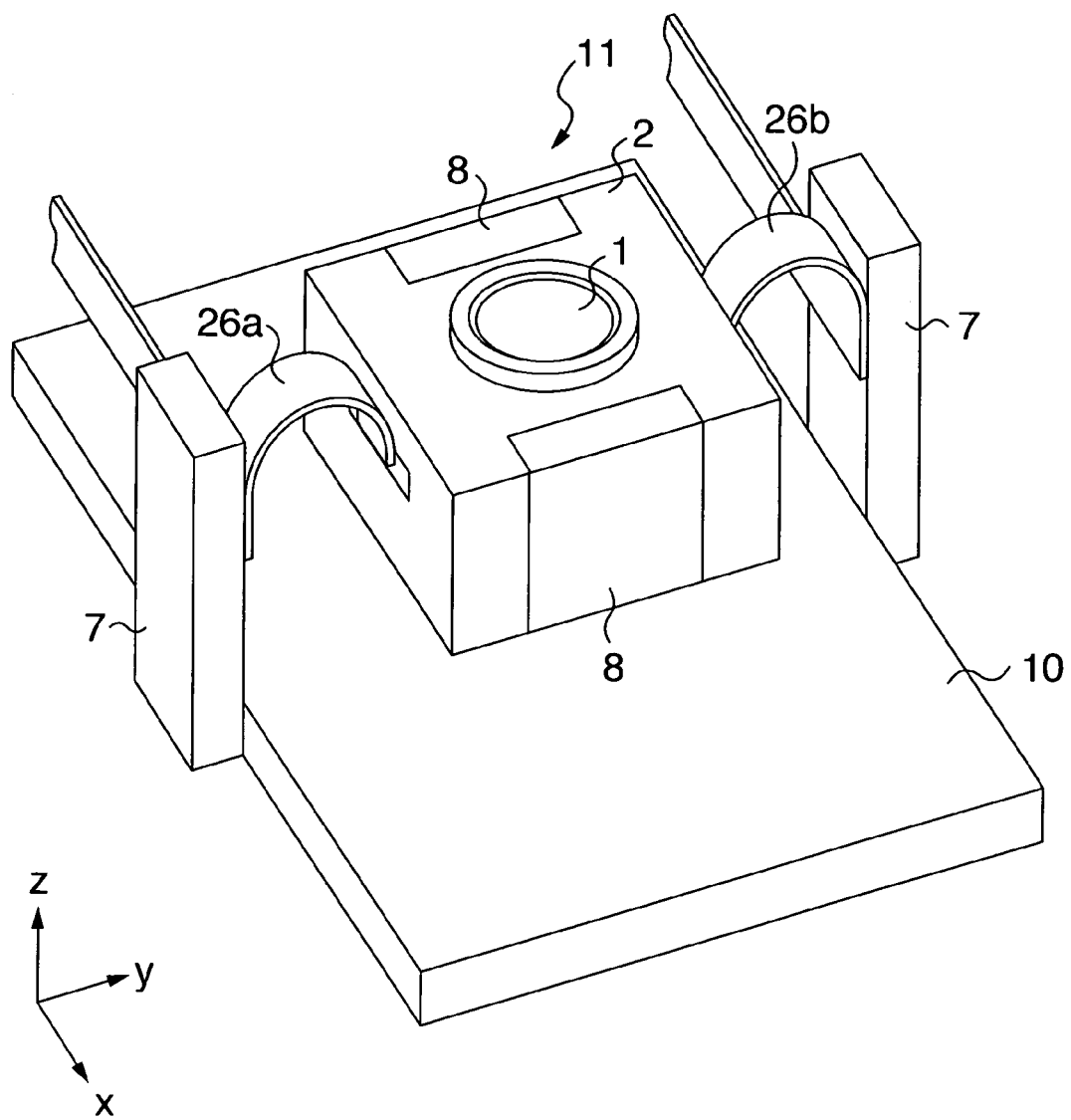
FIG. 5 is an explanatory view of an operation of an objective lens driving means which is different from the present invention.

FIG. 5 shows a case that the movable portion 11 is supported to the fixed portion 7 by elastic plates 26a and 26b curved in any one of focusing directions in each one in both side surfaces perpendicular to the tracking direction. This is provided for making a study of a comparative embodiment with the structure in FIG. 1. As shown in FIG. 5, the movable portion 11 tends to be rotated around the axis y in comparison with FIG. 1, and the objective lens 1 is inclined with respect to the optical disc, whereby an accuracy of recording and reproducing the information is lowered.

As mentioned above, in accordance with the optical pickup of the present invention, since the spring resistance of the support member can be equalized without reference to the operated position in the focusing direction, it is possible to obtain a stable operation having an excellent linear property. Further, in accordance with the optical pickup of the present invention, since the rotation of the movable portion is hard to be generated, it is possible to inhibit the objective lens from being inclined with respect to the optical disc. As a result, the optical pickup in accordance with the present invention can improve a position controllability of the objective lens, and can accurately record and reproduce the optical disc apparatus.

In this case, the embodiment mentioned above is shown as the structure in which the optical parts such as the laser light emitting diode 111, the light detector 112 and the like are mounted in the inner portion of the holder 2, however, the structure may be made such that the optical parts such as the laser light emitting diode 111, the light detector 112 and the like are arranged out of the holder 2. In this case, since a mass of the movable portion 11 becomes light, it is possible to drive the objective lens 1 at a high speed.

Further, the embodiment mentioned above is shown as the structure in which the permanent magnet 8 is arranged in the movable portion, and the first electromagnetic coil and the second electromagnetic coil are arranged in the base side, however, the structure may be made inversely such that the permanent magnet is arranged in the base side, and the first electromagnetic coil and the second electromagnetic coil are arranged in the movable portion. In this case, a current supply to the first electromagnetic coil and the second electromagnetic coil can be easily achieved by arranging a wiring pattern in the elastic plates 6a to 6d constituted by the flexible printed circuit board. Since a mass of the coil is generally smaller than a mass of the permanent magnet, the present structure can further lighten the mass of the movable portion 11, and it is possible to drive the objective lens 1 at a high speed.

INDUSTRIAL APPLICABILITY

The present invention can be utilized in the optical pickup of the optical disc apparatus.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical pickup reading and writing an information with respect to an optical disc by using an objective lens, comprising:
    an objective lens;
    a movable portion mounting said objective lens thereon and having opposite side surfaces;
    a pair of elastic plates curved in a C shape or an O shape; and
    a fixed portion including a pair of fixed members, connected to said movable portion via said pair of elastic plates;
    wherein each of said pair of fixed members has a surface facing to a respective one of the opposite side surfaces of said movable portion which is arranged between said pair of fixed members, and each of said pair of elastic plates has a layout giving the appearance of the C shape or the O shape as seen from a direction perpendicular to an optical axis of said objective lens and is fixedly connected to the opposite side surface of said movable portion and to the surface of said pair of fixed members facing said opposite side surface.

2. An optical pickup as claimed in claim 1, wherein the same plate surface of each of said pair of elastic plates is fixedly connected to the opposite side surface of said movable portion and to the facing surface of said pair of fixed members.

3. An optical pickup as claimed in claim 2, wherein said movable portion is provided with a permanent magnet, and said fixed portion includes a first electromagnetic coil moving said movable portion in a direction parallel to an optical axis of said objective lens, and a second electromagnetic coil moving said movable portion in a direction connecting said opposite side surfaces.

4. An optical pick up as claimed in claim 1, wherein each of said pair of elastic plates has a top portion and a bottom portion.

5. An optical pick up as claimed in claim 4, wherein when said movable portion is moved by said fixed portion in a direction parallel to an optical axis of said objective lens each of said pair elastic plates is placed into a deformed state.

6. An optical pick up as claimed in claim 5, wherein the deformed state of the top portion of a first plate equals to the deformed state of the bottom portion of a second plate, and the deformed state of the top portion of the second plate equals to the deformed state of the bottom portion of the first plate.

* * * * *